(12) United States Patent
Morris et al.

(10) Patent No.: US 11,591,998 B2
(45) Date of Patent: Feb. 28, 2023

(54) HYDRO TRANSITION SYSTEMS AND METHODS OF USING THE SAME

(71) Applicant: Emrgy Inc., Atlanta, GA (US)

(72) Inventors: Emily A. Morris, Atlanta, GA (US); Craig J. Cochran, Atlanta, GA (US); Madeleine M. White, Atlanta, GA (US); Kirk William Charles, Austell, GA (US); Thorsten Stoesser, London (GB)

(73) Assignee: EMRGY INC., Atlanta, GA (US)

( * ) Notice: Subject to any disclaimer, the term of this patent is extended or adjusted under 35 U.S.C. 154(b) by 0 days.

(21) Appl. No.: 16/899,182

(22) Filed: Jun. 11, 2020

(65) Prior Publication Data
US 2021/0095632 A1 Apr. 1, 2021

Related U.S. Application Data

(63) Continuation of application No. 16/133,285, filed on Sep. 17, 2018, now Pat. No. 10,724,497.
(Continued)

(51) Int. Cl.
*F03B 11/02* (2006.01)
*F03B 17/06* (2006.01)

(52) U.S. Cl.
CPC ............ *F03B 11/02* (2013.01); *F03B 17/06* (2013.01); *F05B 2220/706* (2013.01);
(Continued)

(58) Field of Classification Search
CPC .......... F03B 11/02; F03B 17/06; F03B 13/10; F05B 2220/706; F05B 2240/133;
(Continued)

(56) References Cited

U.S. PATENT DOCUMENTS

| 6,109,863 A | 8/2000 | Milliken |
| 6,320,273 B1 | 11/2001 | Nemec |

(Continued)

FOREIGN PATENT DOCUMENTS

| CN | 103001454 A | 3/2013 |
| CN | 104393725 A | 3/2015 |

(Continued)

OTHER PUBLICATIONS

International Search Report & Written Opinion dated May 27, 2020 for International PCT Patent Appl. No. PCT/US2020/023693.
(Continued)

*Primary Examiner* — Carib A Oquendo
(74) *Attorney, Agent, or Firm* — Husch Blackwell, LLP; Bryan D. Stewart; YiKai Chen

(57) ABSTRACT

Systems and methods for hydro-electric power generation are disclosed. The system includes a frame or structure positioned in a waterway or channel, with one or more hydro-transition units secured to corners of the frame. The hydro-transition units include a body of reinforced fabric for redirecting water flow towards the inlet of the frame, effectively increasing the current of the water and allowing for turbines within the frame to generate power at an increased rate. Anchors and bracket systems may secure the hydro-transition units to both the waterway and the frame, thereby allowing the body of reinforced fabric to withstanding force from water-flow within the waterway. The system includes various failsafe mechanisms for disengaging or detaching the hydro-transition units from the frame and/or anchor for reacting to high water flow or volumes (e.g., flooding).

19 Claims, 7 Drawing Sheets

Related U.S. Application Data

(60) Provisional application No. 62/559,258, filed on Sep. 15, 2017.

(52) U.S. Cl.
CPC ..... *F05B 2240/13* (2013.01); *F05B 2240/133* (2013.01); *F05B 2240/911* (2013.01); *F05B 2280/6001* (2013.01)

(58) Field of Classification Search
CPC ............ F05B 2240/13; F05B 2240/911; Y02E 10/20; B63B 2035/4466
See application file for complete search history.

(56) References Cited

U.S. PATENT DOCUMENTS

| | | |
|---|---|---|
| 6,793,458 B2 | 9/2004 | Kawai et al. |
| 7,944,075 B2 | 5/2011 | Boone |
| 8,246,299 B2 | 8/2012 | Razzell et al. |
| 8,616,829 B2 | 12/2013 | Becker et al. |
| 8,807,917 B2 | 8/2014 | Park et al. |
| 8,840,364 B2 | 9/2014 | Warton et al. |
| 8,876,448 B1 | 11/2014 | Hess et al. |
| 9,337,712 B2 | 5/2016 | Storaasli |
| 9,618,002 B1 | 4/2017 | Cabra et al. |
| 10,458,386 B2 * | 10/2019 | Watanabe ............. F03B 17/063 |
| 2002/0197147 A1 | 12/2002 | Kawai et al. |
| 2004/0232702 A1 | 11/2004 | He et al. |
| 2007/0020097 A1 | 1/2007 | Ursua |
| 2007/0063520 A1 | 3/2007 | Ahmad |
| 2008/0018115 A1 | 1/2008 | Orlov |
| 2008/0084067 A1 | 4/2008 | Hill |
| 2008/0267777 A1 | 10/2008 | Lux |
| 2009/0091135 A1 | 4/2009 | Janca et al. |
| 2009/0129928 A1 | 5/2009 | Sauer |
| 2009/0167028 A1 | 7/2009 | Akamine |
| 2009/0230686 A1 | 9/2009 | Catlin |
| 2009/0315329 A1 | 12/2009 | Duffey et al. |
| 2010/0032952 A1 | 2/2010 | Hatch et al. |
| 2010/0084862 A1 * | 4/2010 | Unno ................... F03B 17/063 290/43 |
| 2010/0194112 A1 | 8/2010 | Vince |
| 2010/0253081 A1 | 10/2010 | Schlabach et al. |
| 2010/0295316 A1 | 11/2010 | Grassman |
| 2011/0037333 A1 | 2/2011 | Atallah et al. |
| 2011/0254271 A1 | 10/2011 | Freeman et al. |
| 2012/0223606 A1 | 9/2012 | Storaasli |
| 2013/0069369 A1 | 3/2013 | Salehpoor |
| 2013/0071240 A1 | 3/2013 | Chir et al. |
| 2013/0115045 A1 | 5/2013 | Korac |
| 2013/0134815 A1 | 5/2013 | Powell et al. |
| 2013/0266378 A1 | 10/2013 | French, Sr. |
| 2013/0285383 A1 | 10/2013 | Belarbi |
| 2013/0285384 A1 | 10/2013 | Schultz et al. |
| 2013/0334825 A1 | 12/2013 | Roter et al. |
| 2014/0138954 A1 | 5/2014 | Antonucci et al. |
| 2014/0161642 A1 | 6/2014 | Rajadhyaksha et al. |
| 2014/0183996 A1 | 7/2014 | He et al. |
| 2014/0265335 A1 | 9/2014 | Andreis et al. |
| 2015/0226174 A1 | 8/2015 | Duchene et al. |
| 2015/0343674 A1 | 12/2015 | Lowth et al. |
| 2016/0010620 A1 | 1/2016 | Han |
| 2016/0049855 A1 | 2/2016 | Davey et al. |
| 2017/0054384 A1 | 2/2017 | Post |
| 2017/0138333 A1 | 5/2017 | Toran |
| 2017/0298748 A1 | 10/2017 | Vetters et al. |
| 2018/0106236 A1 | 4/2018 | Lee |
| 2020/0025040 A1 | 1/2020 | Meyer et al. |

FOREIGN PATENT DOCUMENTS

| | | |
|---|---|---|
| EP | 1849999 A2 | 10/2007 |
| GB | 2408778 A | 6/2005 |
| RU | 2216662 C1 | 11/2003 |
| WO | 2006133703 A1 | 12/2006 |
| WO | 2011095240 A2 | 8/2011 |
| WO | 2011160210 A2 | 12/2011 |
| WO | 2013143596 A1 | 10/2013 |
| WO | 2016004506 A1 | 1/2016 |

OTHER PUBLICATIONS

International Search Report and Written Opinion dated Dec. 22, 2016 for International Application No. PCT/US2016/057130.
Davey, "Axial Flux Cycloidal Magnetic Gears", IEEE Transactions on Magnetics 50:4, 2014, 8100607, 7 pages.
International Search Report and Written Opinion dated Jan. 3, 2019 for International Application No. PCT/US2018/051371.
International Search Report and Written Opinion dated Jun. 22, 2017 for International Application No. PCT/US17/24511.
Extended European Search Report dated Oct. 28, 2019 for European Pat. Appl. No. 17776448.7.

* cited by examiner

HYDRO TRANSITION SYSTEMS AND METHODS OF USING THE SAME

CROSS REFERENCE TO RELATED APPLICATIONS

This application claims the benefit of, and priority to, U.S. Provisional Patent App. No. 62/559,258, filed on Sep. 15, 2017, and entitled "HYDRO TRANSITIONS," and is incorporated by reference as if the disclosure of the same was included herein in its entirety.
This application also incorporates by reference the following U.S. and international patent applications:
  U.S. patent application Ser. No. 15/294,074, filed on Oct. 14, 2016, and entitled "CYCLOIDAL MAGNETIC GEAR SYSTEM";
  International Patent App. No. PCT/US2016/057130, filed on Oct. 14, 2016, and entitled "CYCLOIDAL MAGNETIC GEAR SYSTEM";
  International Patent App. No. PCT/US17/24511, filed on Mar. 28, 2017, and entitled "TURBINE HYDROKINETIC ENERGY SYSTEM UTILIZING CYCLOIDAL MAGNETIC GEARS"; and
  U.S. Provisional Patent App. No. 62/687,520, filed on Jun. 20, 2018, and entitled "CASSETTE."

BACKGROUND

Generally, conventional hydro-electric power systems installed in waterways are not designed for optimal power generation. Typically, these hydro-electric power systems are installed into a waterway and only interact with the water that happens (by chance) to pass through the systems. Accordingly, these conventional systems allow for water to either pass through the systems at its natural rate, or escape the hydro-electric power converters by traveling around the system (rather than through). Therefore, there exists a long-felt but unresolved need for systems and methods for improved hydro-electric power generation.

BRIEF SUMMARY OF THE DISCLOSURE

The present disclosure relates generally to systems and methods for transitioning the speed and direction of a fluid (e.g., water) in a waterway (e.g., a shallow flow waterway, opposed to a dam system or the like) such that the fluid is directed into and accelerated through a hydro-electric power generation system. It is generally known that fluids naturally follow a path of least resistance. Accordingly, the system described herein (referred to throughout as a "hydro-transition system") manipulates the path of a fluid such that the fluid is directed through a particular passage. In various embodiments, the systems and methods for manipulating these fluids may result in accelerating the speed of the fluid, which in turn results in increased power generation. According to various aspects of the present disclosure, the systems described herein include a frame or structure installed into a waterway, and one or more hydro-transition systems attached thereto for directing the water from the waterway through the frame, rather than around the frame. These hydro-transition systems also may be further secured to the surrounding area (via an anchor or support beams) for allowing the hydro-transition system to withstand substantial force from a moving body of water. Aspects of the present disclosure provide various improvements over pre-existing technology, such as: 1) increasing the volume of fluid passing through a hydro-electric power generation system; 2) increasing the power generation output via increased fluid speeds; and 3) improved failsafe mechanisms for flood management and other scenarios.

According to a first aspect, a hydrokinetic turbine system including: A) a frame for positioning the turbine system in a waterway; B) one or more turbines operatively connected to the frame; C) at least one bracket coupled to the frame; and D) a transition operatively connected to the at least one bracket, the transition including: 1) a substantially flat body for spanning a distance between the frame and a portion of the waterway; 2) a cable operatively connected to an edge of the substantially flat body, the cable for providing tension in the substantially flat body and connected to the frame and to an end piece; 3) the end piece operatively connected to the substantially flat body, the cable, and an anchor; and 4) the anchor for connecting the substantially flat body to a stationary object.

According to a second aspect, the system of the first aspect or any other aspect, further including a rod operatively connected to an end of the transition and the at least one bracket.

According to a third aspect, the system of the first aspect or any other aspect, wherein the at least one bracket includes a first bracket and second bracket.

According to a fourth aspect, the system the third aspect or any other aspect, wherein: A) the substantially flat body is substantially triangular in shape; B) a first point of the substantially flat triangular-shaped body is connected to the first bracket; and C) a second point of the substantially flat triangular-shaped body is connected to the second bracket.

According to a fifth aspect, the system of the fourth aspect or any other aspect, wherein a third point of the substantially flat triangular-shaped body is connected to the end piece.

According to a sixth aspect, an apparatus including: A) a substantially flat, substantially triangular body; B) at least one cable operatively connected to an edge of the substantially triangular body; C) an end piece operatively connected to the at least one cable and a first corner of the substantially triangular body; and D) an anchor connected to the end piece, the anchor including a mechanism for connecting the substantially triangular body to a stationary object, wherein a length of the substantially triangular body between a second corner and a third corner is configured for receiving a rod, the rod for connecting the substantially triangular body to a frame of a turbine system.

According to a seventh aspect, the apparatus of the sixth aspect or any other aspect, wherein the mechanism for connecting the substantially triangular body to the stationary object is a connector selected from the group including: a ground stake, a hook, a clamp, and a latch.

According to an eighth aspect, a method including: A) providing a substantially flat, substantially triangular body; B) providing at least one cable operatively connected to an edge of the substantially triangular body; C) providing an end piece operatively connected to the at least one cable and a first corner of the substantially triangular body; and D) providing an anchor connected to the end piece, the anchor including a mechanism for connecting the substantially triangular body to a stationary object, wherein a length of the triangular body between a second corner and a third corner is configured for receiving a rod, the rod for connecting the substantially triangular body to a turbine system.

According to a ninth aspect, a system for harvesting hydrokinetic energy in a waterway, the system including: A) a frame positioned perpendicular to an embankment of the waterway, the frame including one or more side walls; B) one or more brackets coupled to a corner of the one or more side walls, wherein the bracket includes a mechanism for securely receiving a pole; and C) one or more hydro-transition units, wherein each of the one or more hydro-transition units include: 1) a substantially flat body, wherein the substantially flat body is a reinforced fabric-based material for spanning a distance between the frame and a portion of the waterway; 2) a cable operatively connected to an edge of the substantially flat body, the cable for providing tension in the substantially flat body; 3) an end piece coupled to the substantially flat body, the cable, and an anchor; and 4) the anchor for connecting the substantially flat body to a stationary object.

According to a tenth aspect, the system of the ninth aspect or any other aspect, wherein the frame further includes a base, the base connecting at least two of the one or more side walls.

According to an eleventh aspect, the system of the ninth aspect or any other aspect, wherein the mechanism for securely receiving the pole includes a circular receptacle of a diameter approximately larger than a diameter of the pole.

According to a twelfth aspect, the system of the ninth aspect or any other aspect, wherein the cable is coupled to the one or more brackets.

According to a thirteenth aspect, a method for harvesting hydrokinetic energy in a waterway, the method including receiving hydrokinetic energy from rotation of at least one turbine within a frame, wherein the at least one turbine is rotated by a flow of shallow water and wherein the flow of shallow water is at least partially directed through the frame via a hydro-transition unit operatively connected to the frame and secured in a position to direct water through the frame within the waterway.

According to a fourteenth aspect, the method of the thirteenth aspect or any other aspect, wherein the hydro-transition unit is secured in the position via an anchor system.

According to fifteenth aspect, the method of the thirteenth aspect or any other aspect, wherein the hydro-transition unit is secured in the position via a jamming anchor in contact with a portion of the waterway.

According to a sixteenth aspect, the method of the thirteenth aspect or any other aspect, wherein the hydro-transition unit is at least partially secured in the position via one or more cables.

According to a seventeenth aspect, the method of the sixteenth aspect or any other aspect, wherein the one or more cables run along a bottom portion of the hydro-transition unit.

According to an eighteenth aspect, the method of the thirteenth aspect or any other aspect, wherein the hydro-transition unit is a first hydro-transition unit of at least two hydro-transition units operatively connected to the frame.

According to a nineteenth aspect, the method of the sixteenth aspect or any other aspect, wherein at least one of the at least two hydro-transition units is operatively connected to the frame at a downstream location from the first hydro-transition unit for creating laminar flow as water exits the frame.

According to a twentieth aspect, a system for harvesting hydrokinetic energy in a waterway, the system including: A) a frame positioned perpendicular to an embankment of the waterway, the frame including one or more side walls; B) one or more brackets coupled to a corner of the one or more side walls, wherein the bracket includes a mechanism for securely receiving a pole; and C) one or more hydro-transition units, wherein each of the one or more hydro-transition units include: 1) a substantially flat body, wherein the substantially flat body is a reinforced fabric-based material for spanning a distance between the frame and a portion of the waterway; 2) a cable operatively connected to an edge of the body, the cable for providing tension in the body; and 3) an anchoring system for anchoring the substantially flat body within the waterway.

According to a twenty-first aspect, the system of the twentieth aspect or any other aspect, wherein the anchoring system includes a jamming anchor extending along a length of the substantially flat body for pressing against at least a portion of the embankment of the waterway.

According to a twenty-second aspect, the system of the twentieth aspect or any other aspect, wherein: A) the anchoring system includes an end piece coupled to the substantially flat body, the cable, and an anchor; and B) the anchor for connecting the hydro-transition unit to a stationary object.

According to a twenty-third aspect, the system of the twentieth aspect or any other aspect, wherein the system further includes one or more turbines operatively connected to the frame for harvesting hydrokinetic energy.

According to a twenty-fourth aspect, the system of the twentieth aspect or any other aspect, wherein the one or more brackets include a first bracket and a second bracket.

According to a twenty-fifth aspect, the system of the twenty-fourth aspect or any other aspect, wherein the first bracket is located proximate a top portion of the frame and the second bracket is located proximate a bottom portion of the frame.

According to a twenty-sixth aspect, the system of the twenty-fifth aspect or any other aspect, wherein: A) the hydro-transition unit further includes a rod operatively connected to the substantially flat body; and B) the rod is operatively connected to the first bracket and the second bracket.

According to a twenty-seventh aspect, a method for harvesting hydrokinetic energy in a waterway, the method including harvesting hydrokinetic energy from rotation of at least one turbine within a frame via at least one gear box operatively connected to the frame and to the at least one turbine, wherein: A) the at least one turbine is rotated by a flow of shallow water; B) the flow of shallow water is at least partially directed through the frame via at least two hydro-transition units operatively connected to the frame; and C) each hydro-transition unit is at least partially secured in a position by one or more cables running along a bottom portion of the hydro-transition unit to direct water through the frame within the waterway.

According to a twenty-eighth aspect, the method the twenty-seventh aspect or any other aspect, wherein the hydro-transition unit is secured in the position via an anchor system.

According to a twenty-ninth aspect, the method of the twenty-seventh aspect or any other aspect, wherein the hydro-transition unit is secured in the position via a jamming anchor in contact with a portion of the waterway.

According to a thirtieth aspect, the method of the twenty-seventh aspect or any other aspect, wherein: A) the at least two hydro-transition units includes: 1) a first hydro-transition unit at a first upstream location; 2) a second hydro-transition unit at a second upstream location; 3) a third hydro-transition unit at a first downstream location; and 4) a fourth hydro-transition until at second downstream location; B) the first hydro-transition unit is operatively connected to the third hydro-transition unit by a first cable; and C) the second hydro-transition unit is operatively connected to the fourth hydro-transition unit by a second cable.

According to a thirty-first aspect, the method of the twenty-seventh aspect or any other aspect, wherein the at least two hydro-transition units are operatively connected to the frame via one or more brackets.

According to a thirty-second aspect, the method of the thirty-first aspect or any other aspect, wherein: A) the at least two hydro-transition units each further includes a rod operatively connected to the substantially flat body; and B) the rod is operatively connected to the one or more brackets.

According to a thirty-third aspect, an apparatus including: A) a substantially flat, substantially triangular body; B) at least one cable operatively connected to an edge of the substantially triangular body; C) an end piece operatively connected to the at least one cable and a first corner of the substantially triangular body; and D) an anchor connected to the end piece, the anchor including a mechanism for connecting the substantially triangular body to a stationary object, wherein a length of the substantially triangular body between a second corner and a third corner is configured for receiving a rod, the rod for connecting the substantially triangular body to a frame of a turbine system.

According to a thirty-fourth aspect, the apparatus of the thirty-third aspect or any other aspect, wherein the mechanism for connecting the substantially triangular body to the stationary object is a connector selected from the group including: a ground stake, a hook, a clamp, and a latch.

According to a thirty-fifth aspect, the apparatus of the thirty-fourth aspect or any other aspect, wherein the mechanism for connecting the substantially triangular body to the stationary object is ground stake.

According to a thirty-sixth aspect, the apparatus of the thirty-third aspect or any other aspect, wherein the rod is operatively connected to one or more brackets operatively connected to the frame.

According to a thirty-seventh aspect, the apparatus of the thirty-sixth aspect or any other aspect, wherein each of the one or more brackets define an opening with a diameter larger than a diameter of the rod.

According to a thirty-eighth aspect, the apparatus of the thirty-sixth aspect or any other aspect, wherein the substantially triangular body includes a fabric material.

According to the thirty-ninth aspect, the apparatus of the thirty-eighth aspect or any other aspect, wherein the fabric material is reinforced.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

Further features and benefits of the present disclosure will be apparent from a detailed description of various embodiments thereof taken in conjunction with the following drawings, wherein similar elements are referred to with similar reference numbers, and wherein.

DETAILED DESCRIPTION OF DRAWINGS

The above and further features of the disclosed exemplary systems and methods will be recognized from the following detailed descriptions and drawings of particular embodiments. In various embodiments, the present systems and methods relate generally to systems and methods for transitioning the speed and direction of a fluid (e.g., water) in a waterway (or the like) such that the fluid is directed into and accelerated through a hydro-electric power generation system. It is generally known that fluids naturally follow a path of least resistance. Accordingly, the system described herein (referred to throughout as a "hydro-transition") manipulates the path of a fluid such that the fluid is directed through a particular passage. In various embodiments, the systems and methods for manipulating these fluids may result in accelerating the speed of the fluid, which in turn results in increased power generation. According to various aspects of the present disclosure, the systems described herein include a frame or structure installed into a waterway (such as, for example, those discussed in the applications incorporated herein by reference), and one or more hydro-transition systems attached thereto for directing the water from the waterway through the frame, rather than around the frame. These hydro-transition systems also may be further secured to the surrounding area (via an anchor or support beams) for allowing the hydro-transition system to withstand substantial force from a moving body of water. Aspects of the present disclosure provide various improvements over pre-existing technology, such as: 1) increasing the volume of fluid passing through a hydro-electric power generation system; 2) increasing the power generation output via increased fluid speeds; and 3) improved failsafe mechanisms for flood management and other scenarios.

Figure 1:
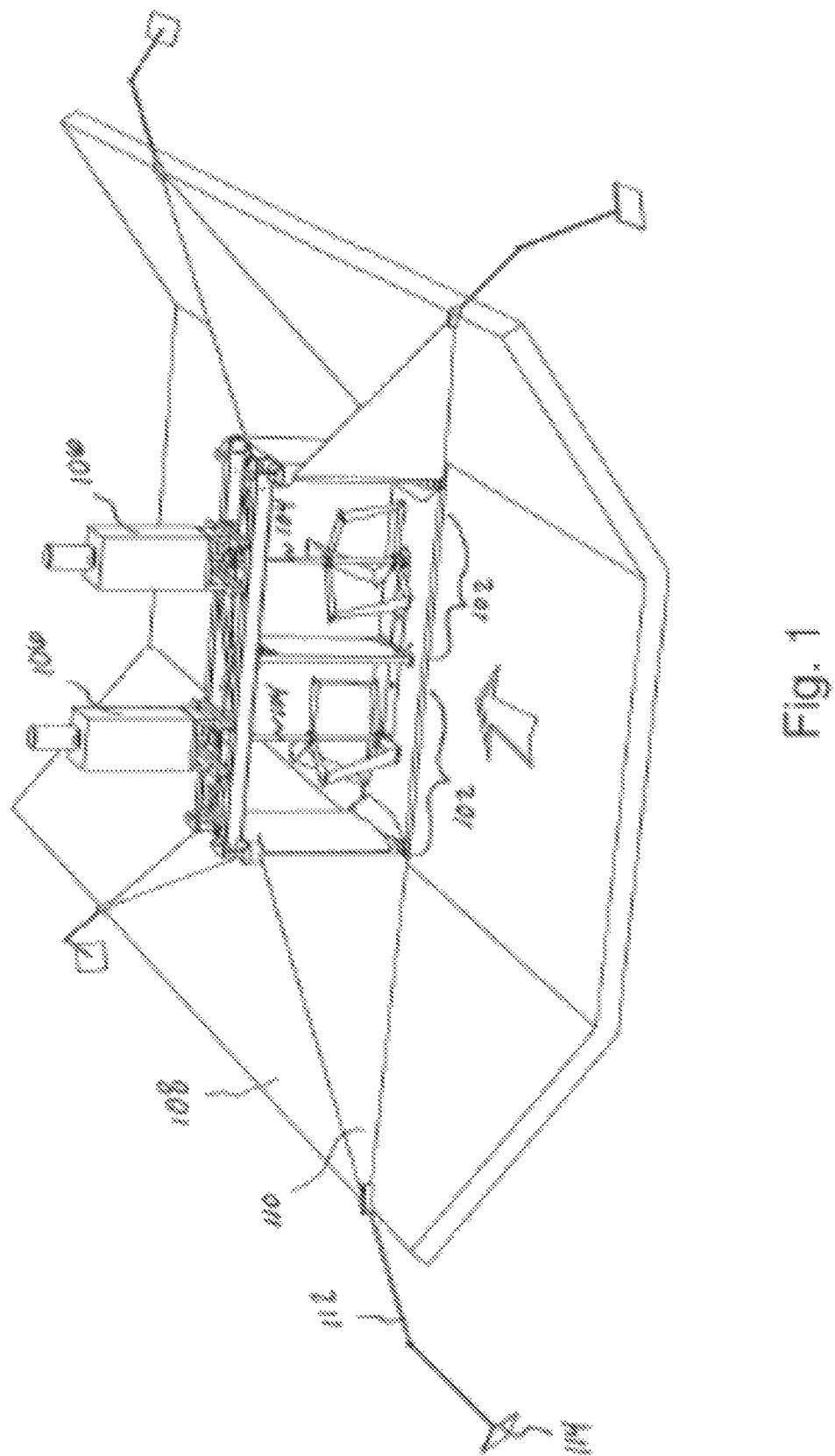
FIG. 1 shows an exemplary hydro-transitions system, according to one aspect of the present disclosure.

Referring now to the drawings, FIG. 1 depicts an exemplary hydro-transitions system 100, according to one aspect of the present disclosure. As discussed above, the exemplary hydro-transitions system 100 may include a hydro-electric power generation structure that optimizes the power generation potential of hydrokinetic fluid turbines, or the like, in a waterway, channel, canal, stream, river, etc. In a particular embodiment, the hydro-transitions system 100 includes at least a frame 102 or similar structure in a waterway 104 or similar channel. According to various aspects of the present disclosure, the frame 102 is installed within the waterway 104 to span approximately the entire width of the waterway 104, such that any water flowing through the waterway 104 may pass through the frame 102. However, in some embodiments, the frame 102 may not span approximately the entire width of the waterway 104, or multiple frames 102 may be adjacently installed within the waterway 104 and the combined widths of the frames 102 may not span the entire width of the waterway 104. In certain embodiments, the exemplary system 100 may also include one or more hydro-transition units 200 (e.g., 1, 2, 3, 4, or more transition units). According to a particular embodiment, the hydro-transition units 200 may include a body of reinforced fabric or material designed and manufactured to maintain its structural integrity when introduced to substantial force, such as a moving body of water. As will be described in greater detail herein, the one or more hydro-transition units 200 may be securely attached the frame 102, and in some embodiments attached to an opposing structure for support (e.g., via an anchor or the like).

As shown in the present embodiment, the hydro-transition units 200 may be substantially triangular-shaped, although it should be understood that the hydro-transition units 200 may take any appropriate shape. In particular embodiments, the hydro-transition units 200 are manufactured to include a shape that allows for maximum interaction with the water in the waterway 104. In one embodiment, the hydro-transition units 200 are installed in such a way (e.g., at a downward and/or inwardly pointing angle/orientation) that the units 200 push water inward and in a focused direction towards the inlet of the frame 102, effectively narrowing the width of the water flow and increasing the flow rate. In this way, and in particular embodiments, turbines or other hydro-electric power generators located within the frame 102 may receive an enhanced power source/supply (e.g., the water), and may thus generate more power.

Figure 2:
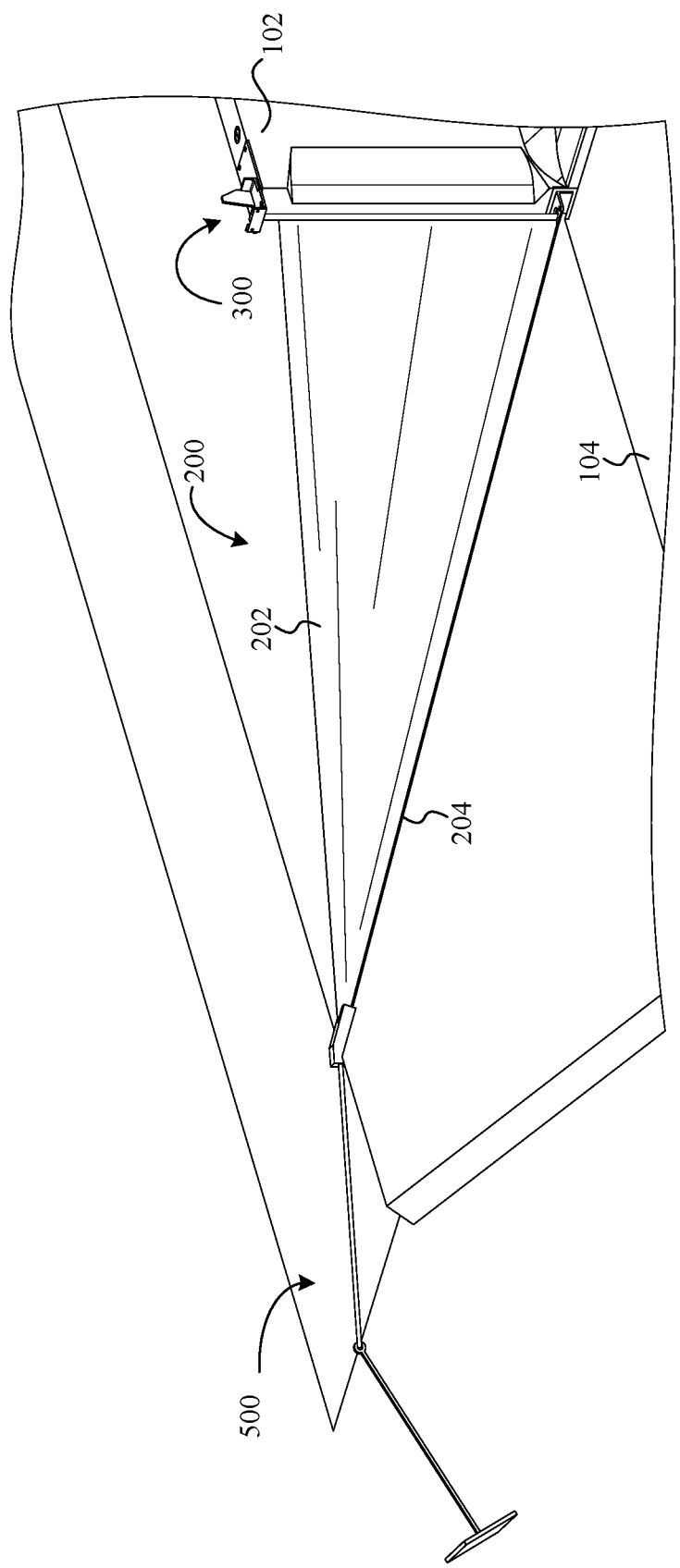
FIG. 2 shows an exemplary hydro-transition, according to one aspect of the present disclosure.

Turning now to FIG. 2, a hydro-transition unit 200 is shown, according to one embodiment. In various embodiments, the hydro-transition unit 200 includes components such as a body 202, a cable 204 (or guy-wire), a connection at a bracket system 300, and an anchor system 500. As discussed above in association with FIG. 1, and depicted in the present embodiment, the body 202 of the hydro-transition unit 200 includes a substantially triangular shape. According to various aspects of the present disclosure, the triangular shape of the body 202 may conform to the wall of the waterway 104, such that any water flowing along the wall of the waterway 104 is "funneled" towards and into the inlet of the frame 102.

In a particular embodiment, the hydro-transitions system 100 discussed herein may include hydro-transition units 200 only at the inlet of the frame 102; however, including hydro-transition units 200 at the outlet of the frame 102 may provide more efficient power generation. According to various aspects of the present disclosure, including hydro-transition units 200 at the outlet of the frame 102 may allow for water to smoothly exit the outlet of the frame 102, thus allowing new water to freely enter and pass through the frame 102. In some embodiments without hydro-transition units 200 at the outlet of the frame 102, water may abruptly exit the frame 102, potentially creating a low pressure pocket at the sides of the frame, and potentially creating a turbulent vortex scenario that may impeded the flow of water through the frame 102 (thus resulting in lower power generation). Therefore, including the hydro-transition units 200 at both the inlet and outlet of the frame 102 may promote laminar flow of the water and result in optimized hydro-electric power generation.

Continuing with FIG. 2, the body 202 of the hydro-transition unit 200 may be supported at the frame 102 by a bracket system 300, and also at the opposite end via an anchor system 500. As will be discussed in greater detail herein (e.g., during the discussion of FIGS. 3 and 5), the hydro-transition unit 200 withstands such substantial force from the water moving within the waterway 104 that multiple points of support allow for the body 202 to best move/transition water into the frame 102 inlet. According to various aspects of the present disclosure, opposite ends of the cable 204 may be attached to either the bracket system 300 or the anchor system 500, and stretched to a particular tension for providing structural support to the body 202. For example, without the cable 204 supporting the body 202, the body 202 may wave or fold under strong water currents (similar to a flag waving when expose to high winds), or the body 202 may begin to fray or erode along the body 202 fringe. In various embodiments, the cable 204 keeps the body 202 taught and thus allows for the most efficient redirection of the water flow into the frame 102 inlet.

In particular embodiments, the body 202 may be constructed in a shape that is suitable to fit a channel, or the like. In some embodiments, the shape of the body 202 is dependent upon the shape of the channel in which the hydro-transition unit 200 is to be installed. In various embodiments, the body 202 may be substantially triangular, substantially parallelepiped (e.g., with multiple cables and anchors), rectangular, etc. In various embodiments, the body 202 may be constructed of any suitable material that may help direct water flow. In particular embodiments, the body 202 is constructed of a fabric, plastic, or a combination of fabric and plastic. In further embodiments, the body 202 may be constructed of light-weight metals, polymers, ceramics, and/or composite materials. Depending on the type of fluid to be controlled, the material of the body 202 may be rust or corrosion resistant. A hydro-transitions system, such as the one described in regards to the example above, may result in an increase of power generation efficiency of a turbine system of about 1%-10%, 10%-20%, 20%-30%, or 40%-70% due to the increased volume and current flow of the water.

Figure 3:
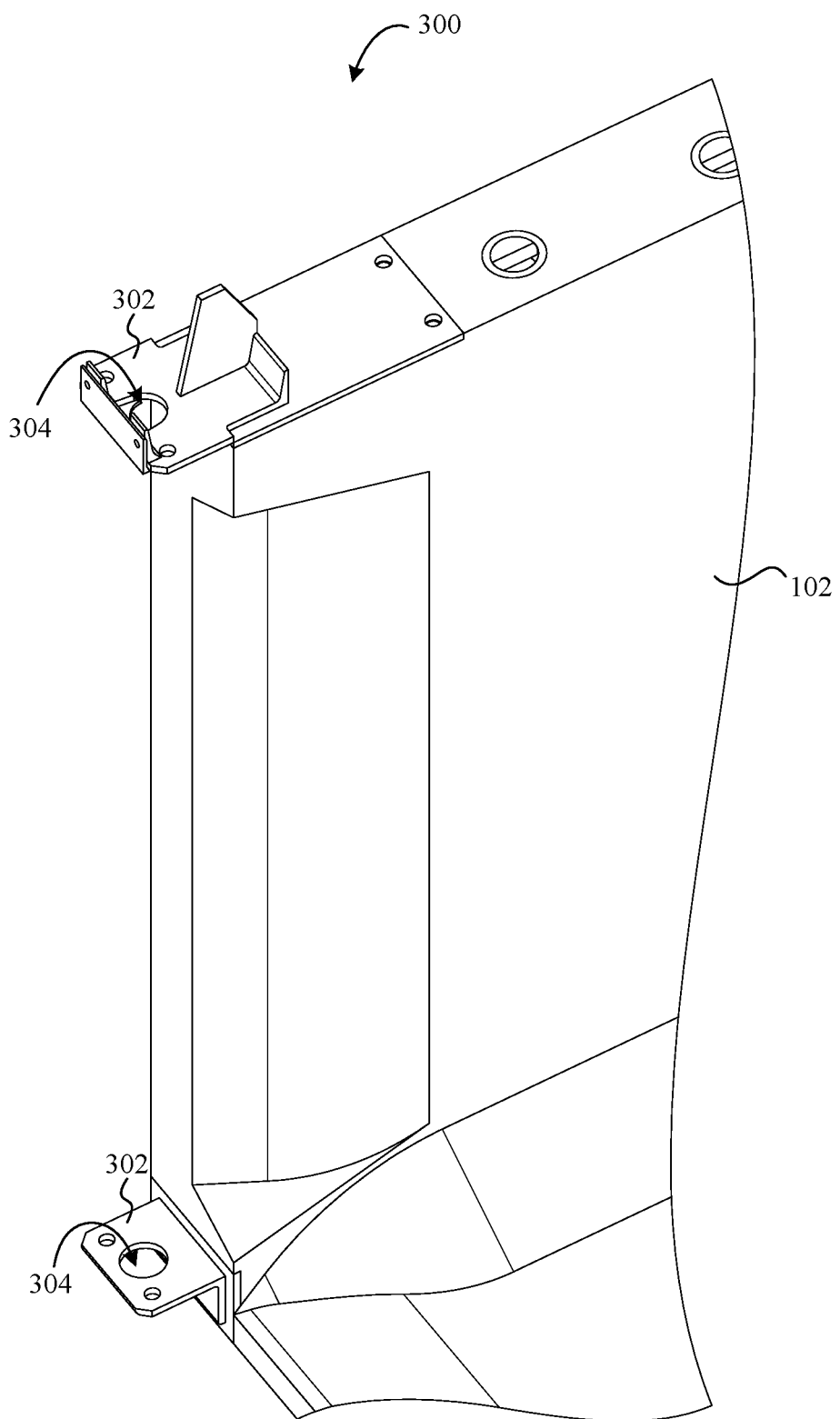
FIG. 3 shows an exemplary frame bracket, according to one aspect of the present disclosure.

FIG. 3 depicts the exemplary bracket system 300, according to one aspect of the present disclosure. In various embodiments, the bracket system 300 includes one or more brackets 302, where each bracket 302 may be securely installed onto a corner of the frame 102. According to various embodiments, the brackets 302 may be installed at each corner of the frame 102 and/or at both the inlet and outlet sides of the frame 102.

In particular embodiments, each bracket 302 is designed to receive a pole or similar support structure that may be attached to the brackets 302. As shown in the present embodiment, the brackets 302 include pole sockets 304, where a pole may be inserted through the top bracket, lowered downward and inserted through the pole socket in the bottom bracket, thereby securing the pole to the brackets 302. As will be discussed in greater detail herein, the hydro-transition unit 200 may be secured to the brackets 302 via a pole, or a similar tool, and may be unsecured by lifting the pole upwards through the brackets 302 and bracket sockets 304.

Figure 4:
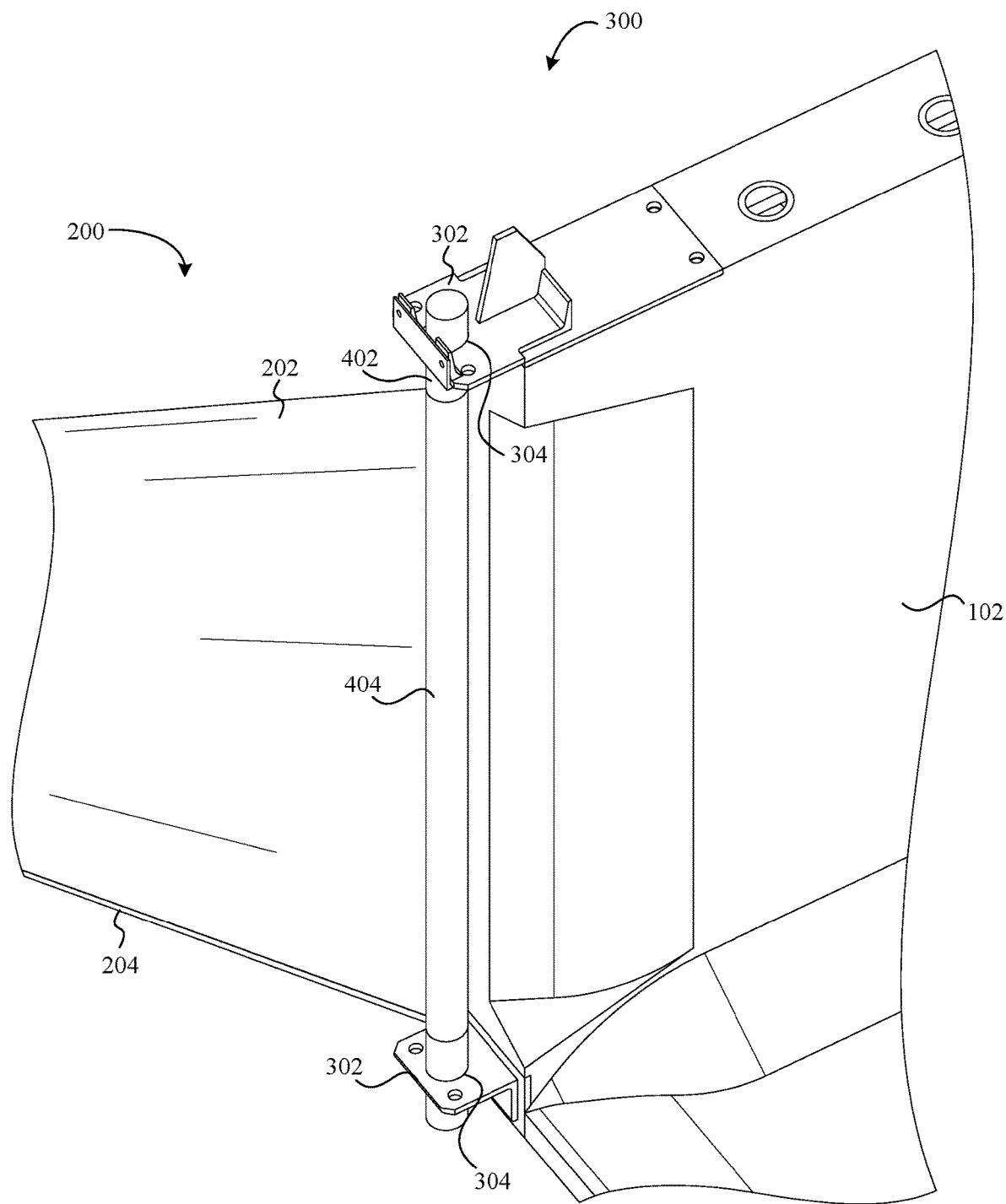
FIG. 4 shows an exemplary frame bracket with attached hydro-transition, according to one aspect of the present disclosure.

FIG. 4 depicts the exemplary bracket system 300 with hydro-transition unit 200 secured therein, according to one aspect of the present disclosure. As mentioned above in association with the discussion of FIG. 3, the present embodiment includes a pole 402 for securely attaching the hydro-transition unit 200 to the bracket system 300. In the present embodiment, the body 202 includes a sleeve 404 for accepting the pole 402. According to various aspects of the present disclosure, the sleeve 404 may be a cylindrical loop or sheath of the same material as the body 202 (or a different material), where a portion of the body is folded backwards and attached to itself (e.g., via stitching, adhesives, applied heat, etc.). In certain embodiments, the sleeve 404 includes a diameter approximately equal to that of the pole 402, or slightly larger, such that the pole 402 may be inserted through the sleeve 404. In various embodiments, the body 202 may be attached to the pole 402 in other ways, such as via a plurality of hooks or a latch/clamp mechanism. In some embodiments, the bracket system 300 may include a quick-release mechanism such that the hydro-transition unit 200 may be quickly detached from the bracket system 300 as a failsafe measure (to be used in emergency scenarios, such as flooding).

According to various aspects of the present disclosure, the cable 204 may be attached to the pole 402 independently from the body 202. For example, the cable 204 may be attached to the pole 402 via a clamp or the like, and the body 202 may be threaded onto the cable 204 (similar to a rod and curtain). As discussed briefly above, the cable 204 allows for the body 202 to remain taught when working to transition the direction of water flow into the inlet of the frame 102.

In particular embodiments, the cable 204 may be any suitable cable constructed of any material suitable for creating tension along the bottom of the hydro-transition unit 200 (e.g. substantially along a wall of a waterway). In one embodiment, the cable 204 is constructed of a metal, such as galvanized carbon steel, carbon steel, stainless steel, etc., PVC, nylon, Teflon, or another suitable material.

In certain embodiments, the cable 204 may be connected to the transition body 202 in any suitable way. In various embodiments, the cable 204 is embedded within the material of the body 202. In some embodiments, the cable 204 is connected along an edge of the transition body 202 via loops, hooks, etc.

As will be understood, multiple cables 204 may be used for a single hydro-transition unit 200. In various embodiments, the system may include a cable 204 along both the top and bottom of the body 200. In some embodiments, the number of cables 204 may depend on the shape and application of the hydro-transition unit 200. In these embodiments, for example, a rectangular transition (with multiple anchors) may include two or more cables 204 for a single transition unit 200. In further embodiments, the system may not include any cables 204 in the transition body 202.

Figure 5:
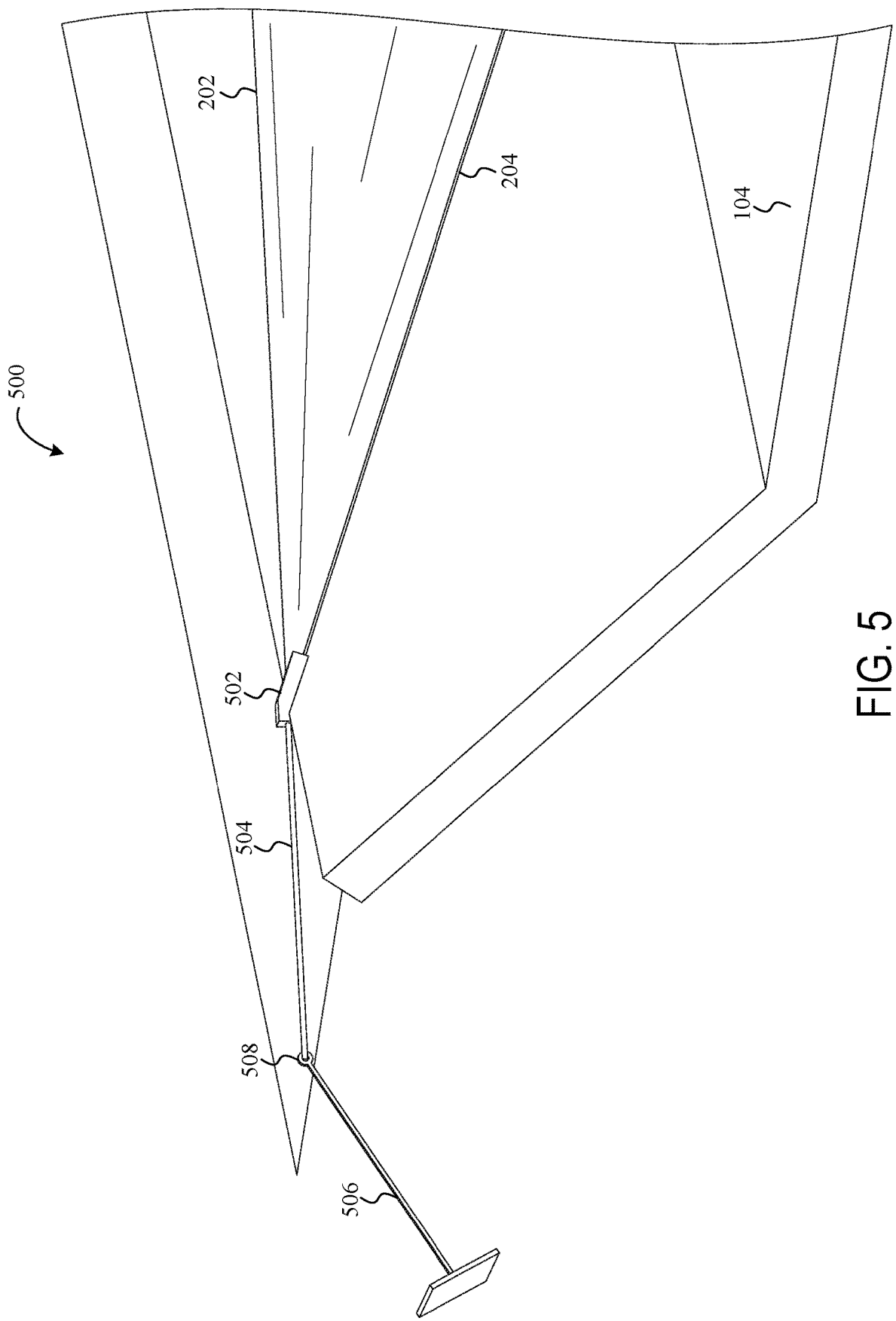
FIG. 5 shows an exemplary hydro-transition anchor, according to one aspect of the present disclosure.

Turning now to FIG. 5, the exemplary anchor system 500 is depicted, according to one aspect of the present disclosure. In various embodiments, the anchor system 500 includes an end piece 502, an anchor cable 504, and an anchor 506. In particular embodiments, the end piece 502 may accept the body 202, the cable 204, and the anchor cable 504, and securely attach each component at a singular/central location (via a clamp or the like). Generally, the end piece 502 is located near the top or outer limit of the waterway 104, which may allow for the end piece 502 to avoid contact with water from the waterway 104 and also to allow the body 202 to cover a maximum area in the waterway 104. For example, if the end piece 502 were located at a position near the middle of the waterway 104, water would escape the body 202 by traveling in the uncaptured space between the body 202 and waterway wall. However, in some embodiments, the system may be designed to allow for at least some water to travel around, under, or through the body 202. In various embodiments, the end piece 502 may take any suitable form or shape and may be constructed of plastic, metal, or other suitable material.

In certain embodiments, the anchor cable 504 may be attached to the anchor 506 at an anchor joint 508. The anchor joint 508, in some embodiments, may include a pin and lock mechanism for securing the anchor 506 to the anchor cable 504, or the anchor 506 and anchor cable 504 may be permanently secured at the anchor joint 508 via welding or another appropriate process. In other embodiments, the anchor 506, anchor joint 508, and anchor cable 504 may be a unitary piece that is manufactured as a single unit. According to various aspects of the present disclosure, the anchor 506, anchor joint 508, anchor cable 504, and end piece 502 may be manufactured of various materials, such as steel, iron, galvanized steel, or other metals and alloys.

Continuing with FIG. 5, the anchor 506 is installed in close proximity to the frame 102 (not shown) for providing resistive force to the body 202 of the hydro-transition unit 200. In particular embodiments, the anchor 506 may be installed in the ground near (or in) the waterway 104 (e.g., in the embankment). For example, the anchor 506 may be driven downwards into the ground, or in some embodiments the ground may be excavated for creating a hole for receiving the anchor, where the hole may be recovered or filled with cement (or another appropriate filling material).

According to various aspects of the present disclosure, the systems discussed herein may be used in a variety of environments. In some situations, the body 202 and/or cable 204 of the transition unit 200 are anchored to an object other than the ground (such as, for example, a tree in situations where the system 100 is installed in a river). In these embodiments, and others, the anchor 506 may take the form of a cable (e.g., to be wrapped around a tree or other object), a clasp (e.g., to be attached to another object), a hook, etc.

Figure 6:
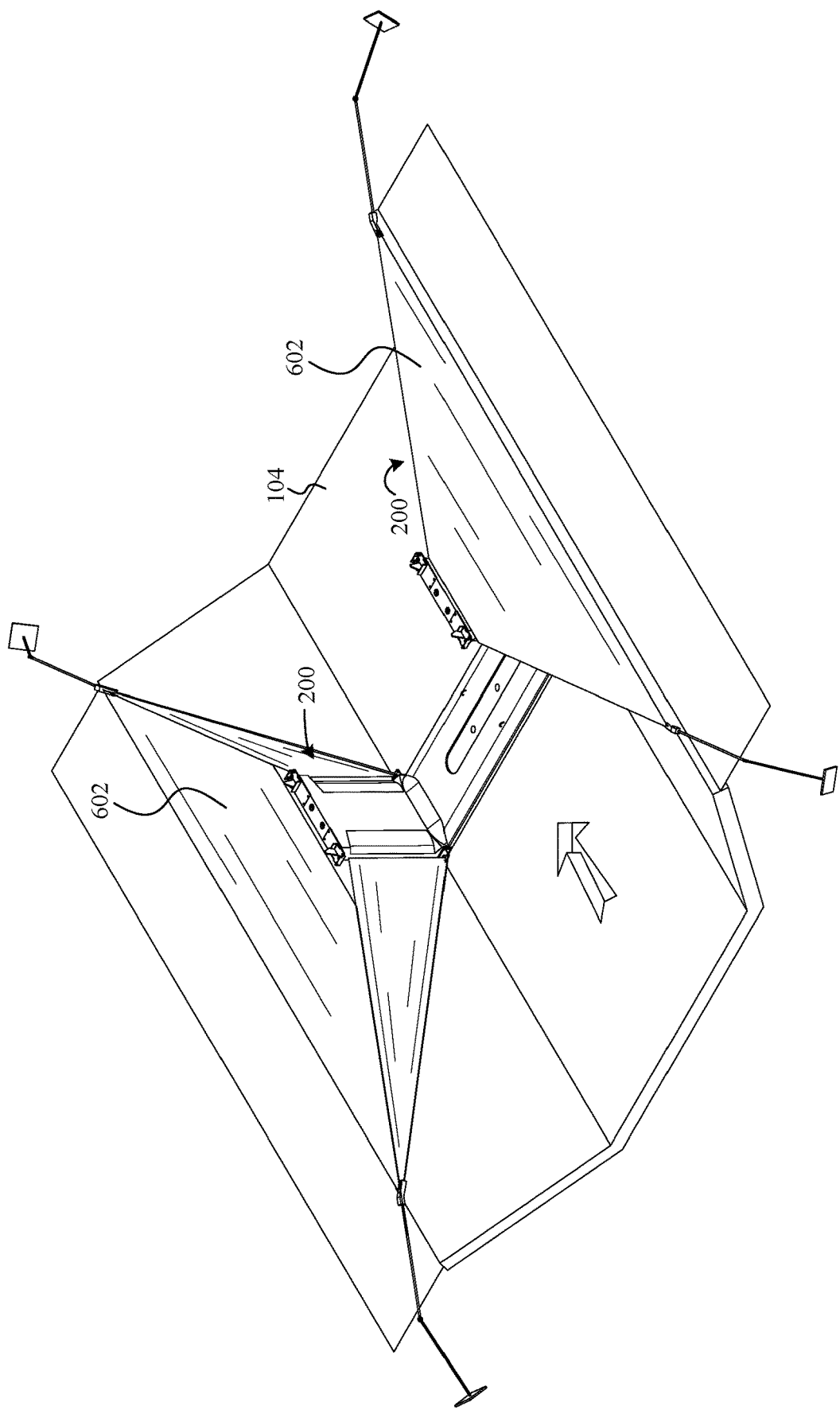
FIG. 6 shows an exemplary hydro-transition system, according to one aspect of the present disclosure.

FIG. 6 depicts an alternate embodiment of the hydro-transitions system 100, according to one aspect of the present disclosure. In some scenarios, based on the waterway 104 shape, it may be beneficial to cover any space between the waterway 104 walls and the bodies of the hydro-transition units 200 (e.g., to prevent water from overflowing into the space, to prevent rubbish from collecting in the space, to prevent wildlife from becoming trapped in the space, etc.) Accordingly, and in various embodiments, the hydro-transition units 200 may include a body 602, where the body 602 covers a space between the waterway 104 wall and the hydro-transition unit 200. In the present embodiment, the body 602 is a unitary component, and may be manufactured as a single fabric or reinforced material. In some embodiments, portions of the body 602 may be manufactured separately and be joined around or near components of the hydro-transition unit 200 (e.g., the cable, bracket system, anchor system). In further embodiments, the body 602 is a unitary piece with the rest of the hydro-transition unit 200 and is inflatable or the like (e.g., to prevent water from passing between the upstream and downstream portions of the hydro-transition unit).

Figure 7:
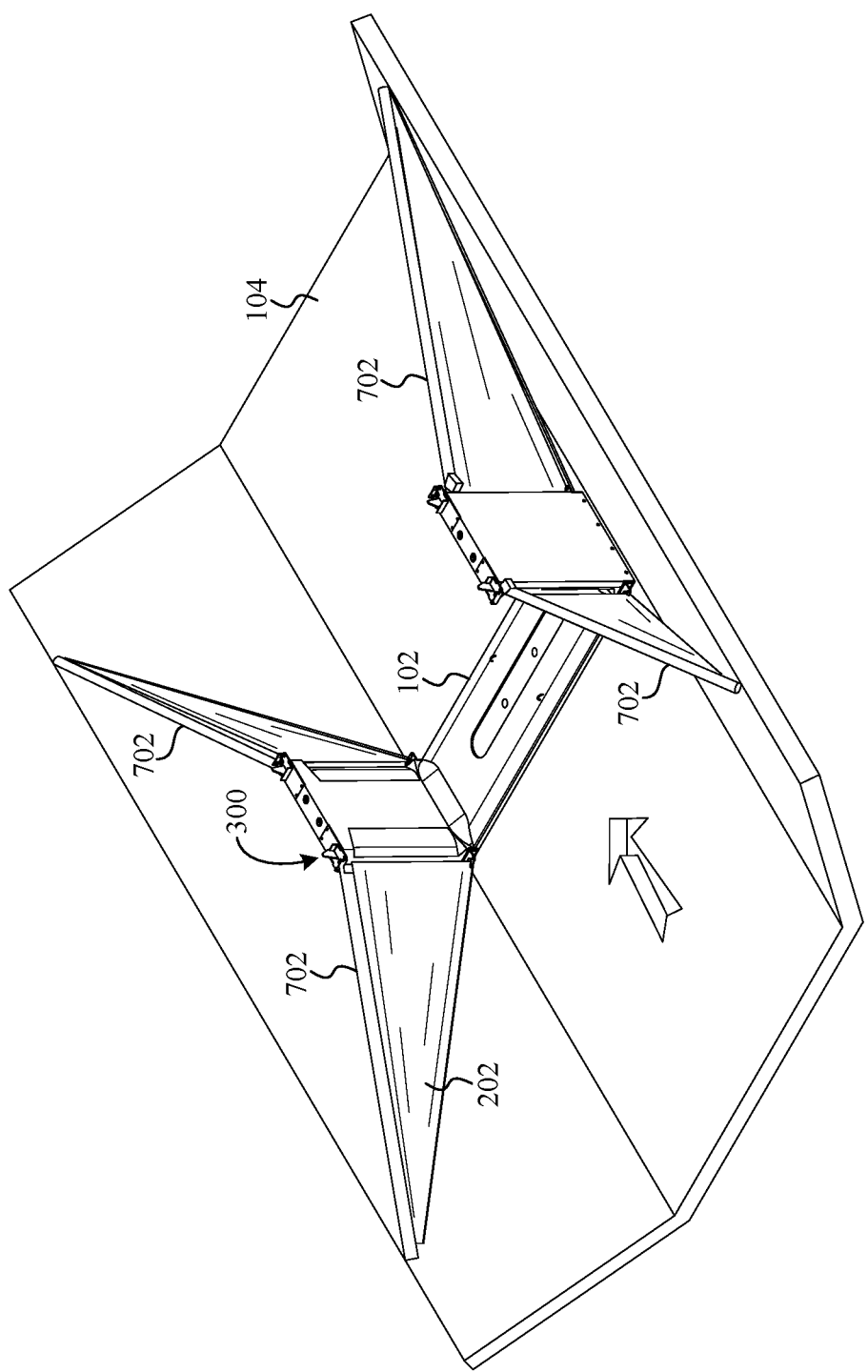
FIG. 7 shows an exemplary hydro-transition system, according to one aspect of the present disclosure.

Turning now to FIG. 7, another alternate embodiment of the hydro-transitions system 100 is depicted, according to one embodiment of the present disclosure. In some scenarios, for example during winter months in a cold climate, the ground near a water channel 104 may be particularly difficult to excavate, notwithstanding help from machinery. In these scenarios, it may be difficult to install an anchor system, such as the anchor system 500 (not shown) described herein. Accordingly, and as shown in the present embodiment, an alternative anchor system may be used, where the alternative anchor system includes a jamming anchor/compression member 702. In particular embodiments, the jamming anchor 702 may be a rod or pole that is securely attached to, or positioned within, the bracket system 300, and furthermore rested on or around the waterway 104 (similar to where an anchor 506 (not shown in FIG. 7) would be positioned). In certain embodiments, the jamming anchor 702 may be operable to withstand compressive loads, such as the force exerted onto the body 202 (or 602) from the water in the waterway 104, and furthermore this force may maintain the jamming anchor 702 in place (e.g., water may press against the body 202 or jamming anchor 702 and press the jamming anchor 702 into a wall of a waterway 104).

According to various aspects of the present disclosure, each corner of the frame 102, or each bracket 302 of the bracket system 300, may accept a jamming anchor 702 for supporting the corners of the frame 102. As such, and in various embodiments, the jamming anchor(s) 702 may act as a brace effectively securing the frame 102 in its position when opposing ends of the jamming anchors 702 are in contact with the surrounding area. In some embodiment, the jamming anchor 702 may be manufactured from steel or other metals and alloys; however, in particular embodiments, the jamming anchor 702 may be manufactured from wood or other organic materials.

In other alternate embodiments, the system may include additional features that assist with the acceleration of fluid through the frame 102, such as, for example, grooves, ridges, etc., on the body 202 (or 602). Additionally, in some alternate embodiments, the body 202 (or 602) may be curved, may form another shape, or may partially lay on the waterway 104 surface to aid in fluid acceleration.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A hydrokinetic turbine system comprising:
a frame for positioning the turbine system in a waterway;
one or more turbines operatively connected to the frame, wherein the one or more turbines are positioned in a vertical orientation and are configured to revolve about a vertical axis; and
a transition operatively connected to the frame, the transition comprising:
a flexible body for spanning a distance between the frame and a portion of the waterway;
a cable operatively connected to an edge of the flexible body such that the cable provides structural support for the flexible body, the cable connected to the frame and to an end piece;
the end piece operatively connected to the flexible body, the cable, and an anchor.

2. The system of claim 1, further comprising a rod operatively connected to an end of the transition and at least one bracket operatively connected to the frame;
the flexible body further comprising a sleeve for receiving the rod, wherein a first portion of the flexible body is folded onto a second portion of the flexible body to form the sleeve.

3. The system of claim 2, wherein the at least one bracket comprises a first bracket and second bracket.

4. The system of claim 3, wherein:
the flexible body is triangular in shape and is comprised of a fabric material for directing water through the turbine system;
a first point of the flexible triangular-shaped body is connected to the first bracket; and
a second point of the flexible triangular-shaped body is connected to the second bracket.

5. The system of claim 4, wherein a third point of the flexible triangular-shaped body is connected to the end piece.

6. An apparatus comprising:
a flexible body;
at least one cable operatively connected to the flexible body;
an end piece operatively connected to the at least one cable and a first corner of the flexible body; and
an anchor connected to the end piece, the anchor comprising a mechanism for connecting the flexible body to a stationary object,
wherein a length of the flexible body between a second corner and a third corner is folded onto a portion of the flexible body to form a sleeve that is configured for receiving a rod that connects the flexible body to a frame of a turbine system,
wherein the turbine system comprises one or more turbines positioned in a vertical orientation and are configured to revolve about a vertical axis.

7. The apparatus of claim 6, wherein the mechanism for connecting the flexible body to the stationary object is a connector selected from the group comprising: a ground stake, a hook, a clamp, and a latch.

8. The apparatus of claim 7, wherein the mechanism for connecting the flexible body to the stationary object is ground stake.

9. The apparatus of claim 6, wherein the rod is operatively connected to one or more brackets operatively connected to the frame.

10. The apparatus of claim 9, wherein each of the one or more brackets define an opening with a diameter larger than a diameter of the rod.

11. The apparatus of claim 9, wherein the flexible body comprises a fabric material for directing water through the turbine system.

12. The apparatus of claim 11, wherein the fabric material is reinforced.

13. A system for harvesting hydrokinetic energy in a waterway, the system comprising:
a frame positioned perpendicular to an embankment of the waterway, the frame comprising one or more side walls;
one or more turbines positioned in a vertical orientation within the frame configured to revolve about a vertical axis for harvesting hydrokinetic energy; and one or more hydro-transition units, wherein each of the one or more hydro-transition units comprise:

a flexible body, wherein the flexible body is a reinforced fabric-based material for spanning a distance between the frame and a portion of the waterway;

a cable operatively connected to an edge of the body such that the cable provides structural support for the flexible body; and an anchoring system for anchoring the flexible body within the waterway.

14. The system of claim 13, wherein the anchoring system comprises a jamming anchor extending along a length of the flexible body for pressing against at least a portion of the embankment of the waterway.

15. The system of claim 13, wherein:
the anchoring system comprises an end piece coupled to the flexible body, the cable, and an anchor; and
the anchor for connecting the hydro-transition unit to a stationary object.

16. The system of claim 13 further comprising a first bracket and a second bracket.

17. The system of claim 16, wherein the first bracket is located proximate a top portion of the frame and the second bracket is located proximate a bottom portion of the frame.

18. The system of claim 17, wherein:
the hydro-transition unit further comprises a rod operatively connected to the flexible body; and
the rod is operatively connected to the first bracket and the second bracket.

19. The system of claim 13, wherein the reinforced fabric-based material directs water through the hydro-transition units.

* * * * *